(12) United States Patent
Kaja et al.

(10) Patent No.: US 11,250,484 B2
(45) Date of Patent: Feb. 15, 2022

(54) SYSTEMS AND METHODS FOR SECURE ASSISTED ORDER GENERATION

(71) Applicant: Verizon Patent and Licensing Inc., Arlington, VA (US)

(72) Inventors: Hussair Kaja, Irving, TX (US); Arun Prabhu Selvaraj, Irving, TX (US); Rajnish Bhasin, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 16/686,430

(22) Filed: Nov. 18, 2019

(65) Prior Publication Data
US 2021/0150599 A1  May 20, 2021

(51) Int. Cl.
*G06Q 30/06* (2012.01)
*G06Q 20/36* (2012.01)
*H04M 3/51* (2006.01)
*G06Q 20/32* (2012.01)

(52) U.S. Cl.
CPC ..... *G06Q 30/0617* (2013.01); *G06Q 20/3224* (2013.01); *G06Q 20/3672* (2013.01); *G06Q 20/3674* (2013.01); *G06Q 30/0641* (2013.01); *H04M 3/5191* (2013.01)

(58) Field of Classification Search
CPC ........... G06Q 30/0617; G06Q 20/3674; G06Q 20/3224; G06Q 30/0641; G06Q 20/3672; G06Q 20/322; G06Q 20/401; H04M 3/5191; H04M 2203/6081; H04M 2203/1058; H04M 2203/105; H04L 2463/102
See application file for complete search history.

(56) References Cited

U.S. PATENT DOCUMENTS

| | | | |
|---|---|---|---|
| 8,219,490 B2* | 7/2012 | Hammad | G06Q 20/102 705/44 |
| 9,420,103 B1* | 8/2016 | Varman | H04M 3/42068 |
| 9,805,348 B2* | 10/2017 | Sinton | G06Q 20/4016 |
| 10,140,611 B1* | 11/2018 | Johansson | G06Q 20/382 |
| 2003/0172038 A1* | 9/2003 | Sawusch | G06Q 20/04 705/67 |
| 2003/0226103 A1* | 12/2003 | Hayer | G06F 16/9562 715/205 |
| 2004/0030607 A1* | 2/2004 | Gibson | G06Q 20/085 705/75 |

(Continued)

OTHER PUBLICATIONS

Owais, Syed, Seema Khanna, and R Mani. "Innovation in Service Delivery Platform: a Case for SMS Gateway." Proceedings of the 10th International Conference on Theory and Practice of Electronic Governance. ACM, 2017. 570-571. Web. (Year: 2017).*

(Continued)

*Primary Examiner* — Ashford S Hayles

(57) ABSTRACT

A system described herein may provide for the verification of payment information associated with a particular user request. The payment information may be verified by a third party and provide verification information to the call center processing the order request. Some information may be provided by the call center processing through the request by receiving information regarding the particular user from a repository.

20 Claims, 9 Drawing Sheets

(56) References Cited

U.S. PATENT DOCUMENTS

| | | | |
|---|---|---|---|
| 2004/0049430 A1* | 3/2004 | Redenbaugh | G06Q 30/0617 705/26.81 |
| 2006/0227953 A1* | 10/2006 | Hwang | G06Q 30/00 379/201.02 |
| 2007/0152041 A1* | 7/2007 | Hawkins | G06Q 30/02 235/383 |
| 2007/0219926 A1* | 9/2007 | Korn | G07F 7/1008 705/67 |
| 2007/0287413 A1* | 12/2007 | Kleitsch | H04L 12/14 455/405 |
| 2008/0059326 A1* | 3/2008 | Sugahara | G06Q 30/0641 705/26.81 |
| 2009/0089181 A1* | 4/2009 | Mathis, Jr. | H04L 63/0823 705/26.1 |
| 2010/0161468 A1* | 6/2010 | Hickman | G06Q 40/00 705/35 |
| 2011/0110364 A1* | 5/2011 | Fried | H04M 3/5191 370/352 |
| 2011/0119157 A1* | 5/2011 | Sivanathan | G06Q 20/12 705/26.41 |
| 2011/0264992 A1* | 10/2011 | Vishria | G06F 16/9566 715/208 |
| 2012/0029685 A1* | 2/2012 | Keller | G06Q 10/087 700/216 |
| 2012/0054095 A1* | 3/2012 | Lesandro | G06Q 20/12 705/39 |
| 2012/0209777 A1* | 8/2012 | Tredeau | G06Q 20/3821 705/64 |
| 2014/0006158 A1* | 1/2014 | Cooper | G06Q 30/0258 705/14.56 |
| 2014/0172712 A1* | 6/2014 | Petersen | G06Q 10/00 705/44 |
| 2014/0249901 A1* | 9/2014 | Qawami | G06Q 30/0226 705/14.17 |
| 2014/0337206 A1* | 11/2014 | Talker | G06Q 20/0658 705/41 |
| 2014/0337424 A1* | 11/2014 | Lee | H04L 63/0823 709/204 |
| 2015/0087265 A1* | 3/2015 | Disraeli | H04W 12/068 455/411 |
| 2016/0005042 A1* | 1/2016 | Tervo | H04W 4/80 705/67 |
| 2016/0180305 A1* | 6/2016 | Dresser | G06Q 20/20 705/40 |
| 2017/0034353 A1* | 2/2017 | Bell | H04L 63/0853 |
| 2017/0109717 A1* | 4/2017 | Vafeas | G06Q 20/3672 |
| 2017/0308883 A1* | 10/2017 | Black | G06Q 20/206 |
| 2018/0255004 A1* | 9/2018 | Lanka | H04L 67/26 |
| 2018/0262345 A1* | 9/2018 | Frederick | H04L 9/3268 |
| 2019/0043037 A1* | 2/2019 | Martin | G06Q 20/42 |
| 2019/0244196 A1* | 8/2019 | John | G06Q 20/24 |
| 2020/0145823 A1* | 5/2020 | Nair | G06F 21/36 |

OTHER PUBLICATIONS

Khan, Zeeshan Shafi et al. "Realization of Call-Back Authentication (CBA) for Secure Web to Cellular Phone SMS Communication." Computers & mathematics with applications (1987) 60.2 (2010): 198-208. Web. (Year: 2010).*

* cited by examiner

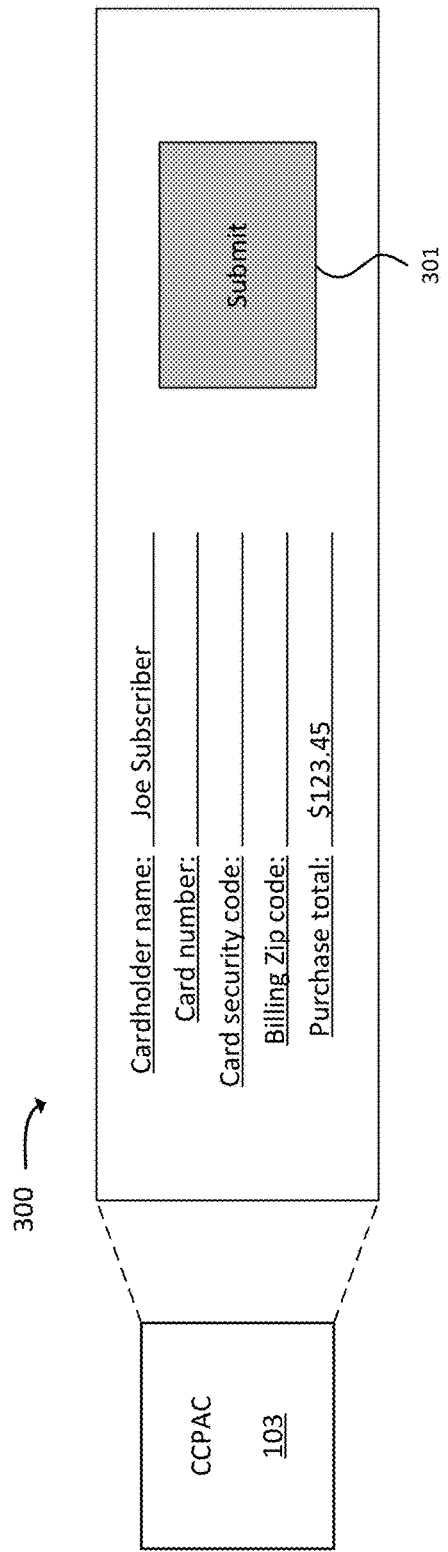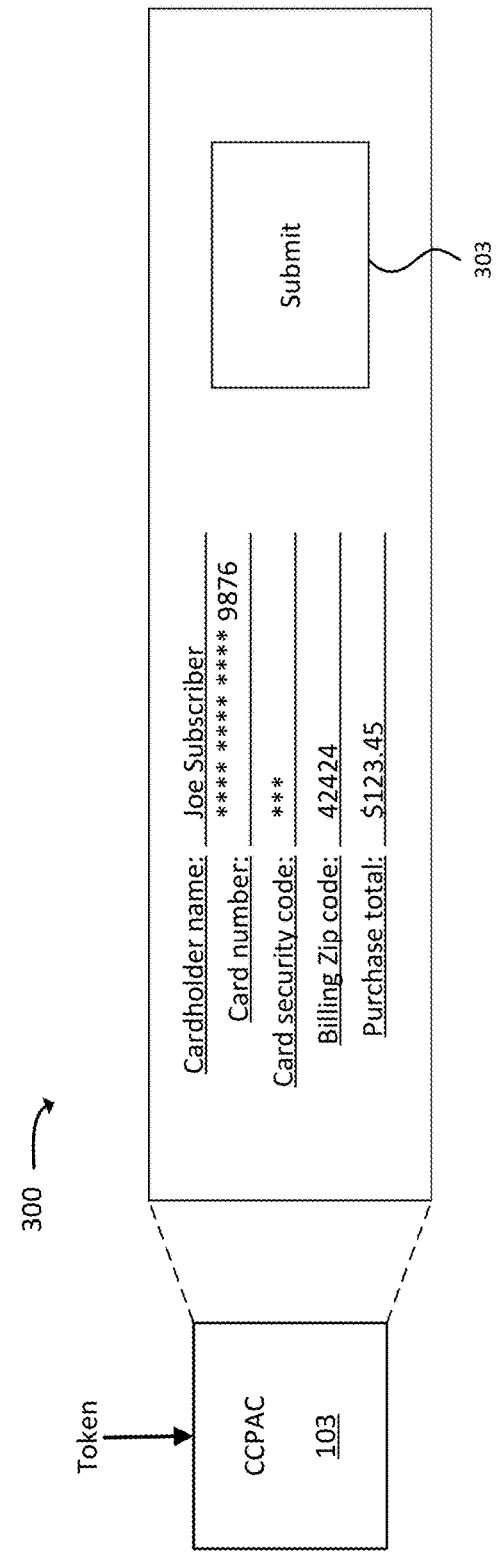

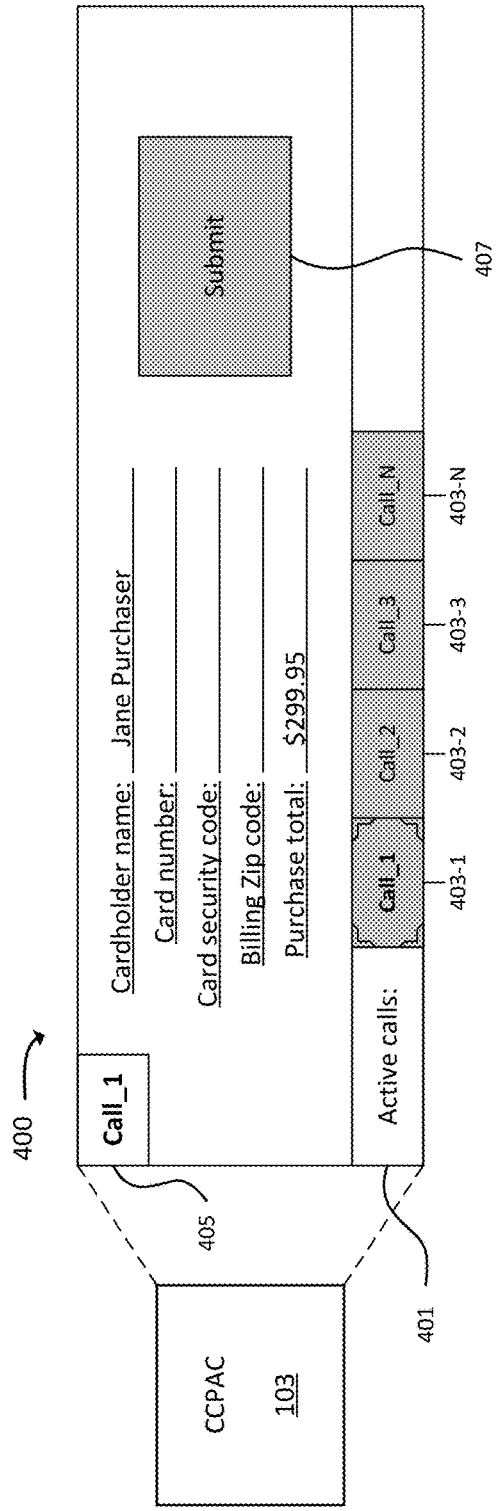
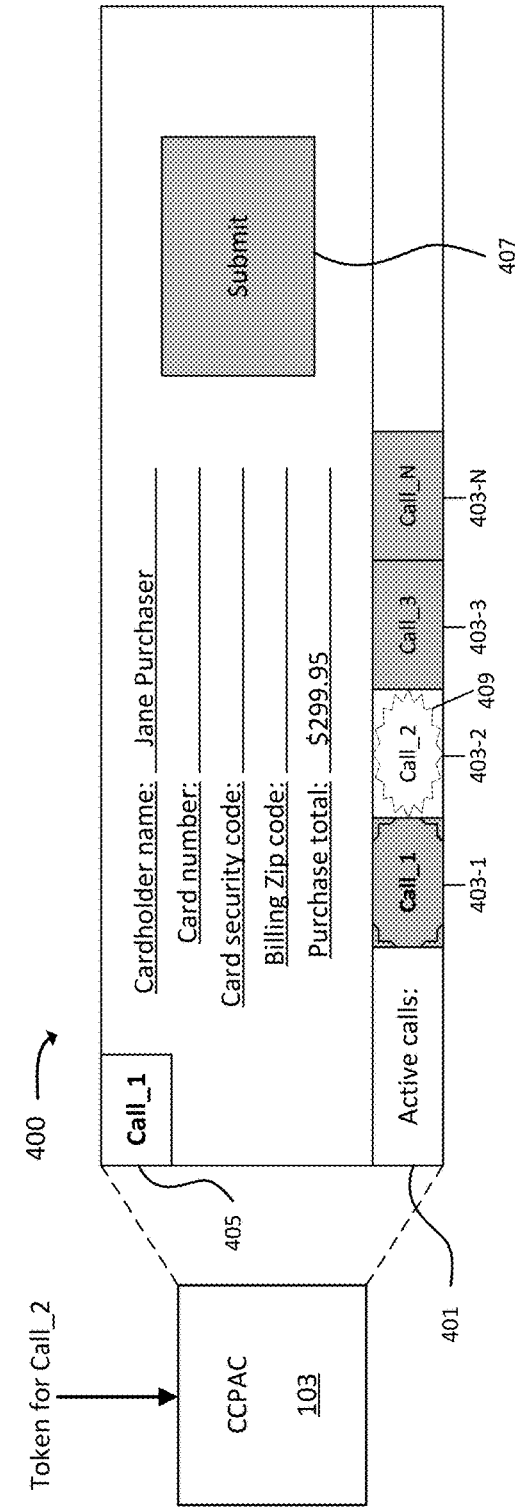
FIG. 4A
FIG. 4B

SYSTEMS AND METHODS FOR SECURE ASSISTED ORDER GENERATION

BACKGROUND

Call centers provide the opportunity for individuals to communicate with call center agents via User Equipment ("UE"), such as mobile telephones. Third party systems may be used for the authentication or verification of payment information for orders placed with call centers.

BRIEF DESCRIPTION OF THE DRAWINGS

FIGS. 3A and 3B illustrate an example graphical user interface ("GUI") of one or more embodiments described herein, in which a CCPAC GUI is modified after receiving a token, allowing a user to submit an order for payment processing;

FIGS. 4A-4C illustrate an example GUI of one or more embodiments described herein, in which a CCPAC manages an active call queue which provides an indication when a token is received for a particular call;

DETAILED DESCRIPTION OF THE PREFERRED EMBODIMENTS

The following detailed description refers to the accompanying drawings. The same reference numbers in different drawings may identify the same or similar elements.

Embodiments described herein provide for the generation of assisted orders, which may involve a call center and a user in contact with the call center (e.g., via a User Equipment ("UE"), such as a mobile telephone). In some embodiments, a Verification System ("VS") may process or authenticate payments and/or payment information from the user, and notify the call center when the payments have been authorized. For instance, in accordance with some embodiments, a User UE may provide payment information to a VS via a portal generated by a Call Center Payment Assistance Component ("CCPAC"), which may be a device or system associated with a call center with which the UE is engaged in an active call. The VS may verify the provided payment information and provide a token to the CCPAC. The use of the unique portal generated by the CCPAC may allow for secure processing of payment information and may shift liability or responsibility for handling payments away from the call center associated with the CCPAC.

For example, as described herein, a VS may receive payment information, associated with an order for a product or service, from a UE and verify, authorize, authenticate, etc., the information with a payment provider (e.g., bank, credit card company, etc.). The VS may then generate a token based on verified payment information and provide the token to the CCPAC. The use of the token may allow the CCPAC to complete an order without directly receiving the payment information from the UE, and may allow the call center (e.g., an agent at the call center, who may be communicating with a user of the UE) to discuss the order with the user of the UE (e.g., the agent may assist the user during the order process) without knowing the details of the user's payment information. In some embodiments, the CCPAC may receive the user's payment information, and may submit the payment information with the token. In some embodiments, as described herein, some or all of the payment information may be masked such that a user associated with the CCPAC (e.g., an agent at a call center) may not be able to view or access the payment information. Because the payment information has already been verified by the VS (e.g., as indicated by the token), liability or responsibility for the payment may be alleviated or removed from the call center. Further, upon receiving confirmation that the order has been completed (e.g., after finalizing the order, including using the token from the VS), the CCPAC may notify the UE that the order has been completed. In turn the UE may present an order confirmation, prompt for further user input (e.g., acceptance of terms and conditions), or the like.

Figure 1:
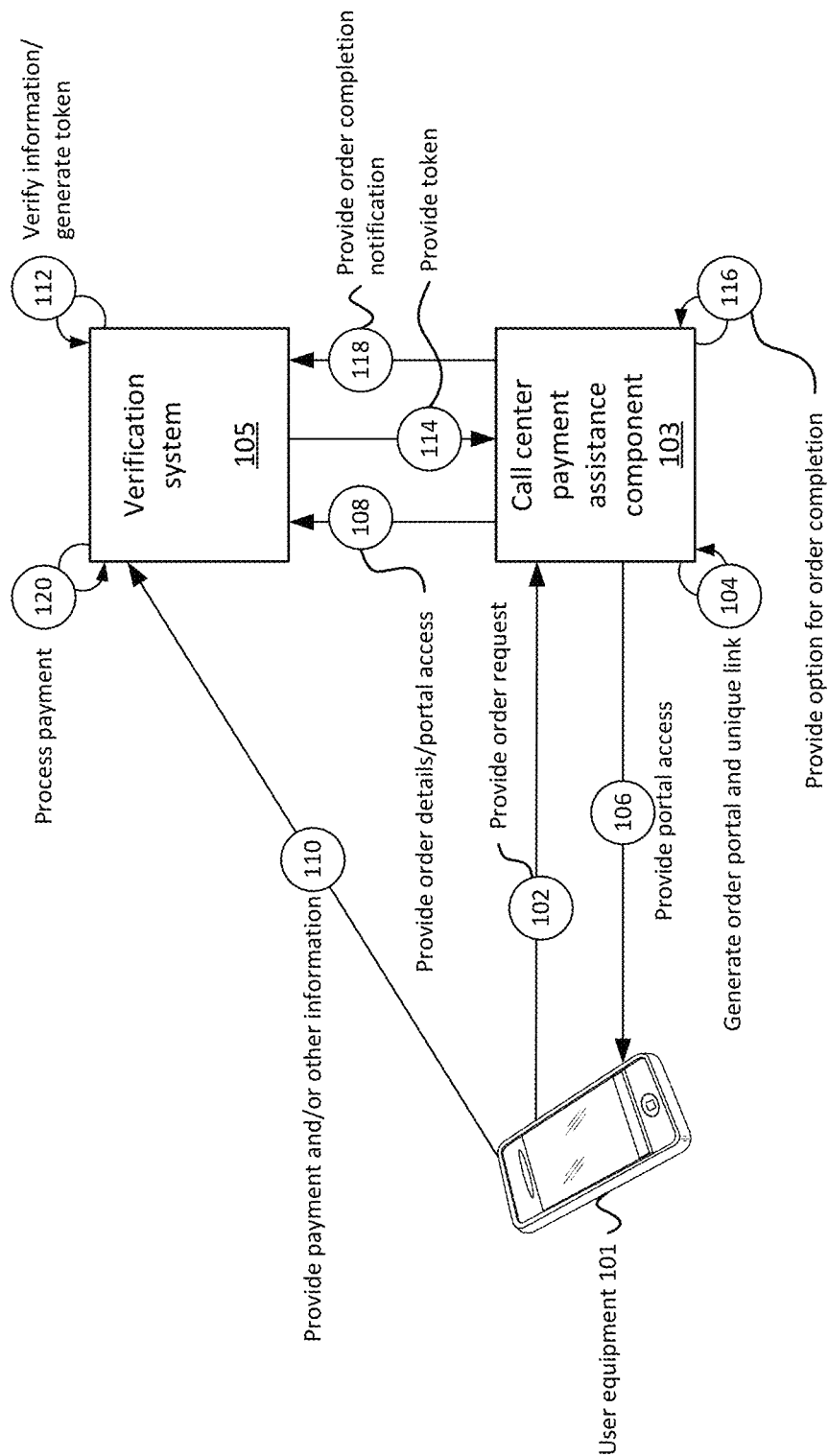
FIG. 1 illustrates an example overview of one or more embodiments described herein, in which a User Equipment ("UE") communicates with a Call Center Payment Assistance Component ("CCPAC") and Verification System ("VS") to generate an assisted order.

FIG. 1 illustrates, for example, an overview of an assisted order process based on a token verifying payment information provided by UE 101, which is communicating with a call center (e.g., is communicating with CCPAC 103). For example, CCPAC 103 may receive (at 102) an order request from UE 101. The order request may contain information regarding products and/or services (e.g., a phone, phone accessory, service plan changes such as adding or subtracting service lines, changing data plan type, etc.) to be ordered. In some embodiments, the order request may include, and/or may be based on, communications between UE 101 and the call center (and/or with CCPAC 103), and may be communicated via a voice call, text messaging, selections in a GUI, etc.

CCPAC 103 may generate (at 104) an order portal and unique link via which the order portal may be accessed. The order portal may contain information received (at 102) in the order request, such as the products and/or services to be ordered, pricing information, and/or other suitable information. As described below, the order portal may further contain information regarding the subscriber associated with UE 101, such as the subscriber name, address (e.g., billing, shipping, and/or service address, etc.), phone number(s), and/or other information. In the absence of known information, the order portal may request additional information regarding the subscriber or the purchase to be provided by UE 101 (e.g., through form fields allowing input, etc.). The unique link may be a unique uniform resource locator ("URL") and/or may be, or may include, other suitable locator information and/or an address which can be used to access the generated portal. The unique link may be time-sensitive (e.g., expire after a set amount of time) and/or may be secured to prevent unauthorized access (e.g., through a login portal, unique code required to access the link, etc.).

CCPAC 103 may provide (at 106) portal access to UE 101. As previously described, the unique link may lead to a portal requesting additional information from UE 101 (e.g., payment information, acceptance of contractual terms, etc.). The access may be provided to UE 101, for example, through an email, text message (e.g., Short Messaging Service ("SMS") message, Multimedia Messaging Service ("MIMS") message, etc.), and/or some other type of message. In some embodiments, when the unique link is accessed, CCPAC 103 may verify that a device, from which the unique link was accessed, is authorized to access the account associated with UE 101. For example, metadata included with a request associated with accessing the link (e.g., an Hypertext Transfer Protocol ("HTTP") GET request, an HTTP POST request, etc.) may include one or more device identifiers (e.g., Mobile Directory Number ("MDN"), Internet Protocol ("IP") address, and/or some other suitable identifier). CCPAC 103 may verify that the device identifier(s) match one or more device identifiers associated with the same account as UE 101. For example, CCPAC 103 may query UDM 540 and/or some other suitable device to determine the device(s) associated with UE 101. Additionally, or alternatively, VS 105 may receive a device identifier associated with a device that accessed the portal, and communicate with CCPAC 103 to verify that the device accessing the portal is authorized (e.g., is associated with a same account as UE 101, and/or is otherwise authorized to access the portal provided to UE 101).

As depicted, CCPAC 103 may provide (at 108) order details and portal access to VS 105. The provided order details may include information such as the subscriber name, billing address, and/or other information regarding the purchase relevant to verifying payment information.

As further depicted, UE 101 may provide (at 110) payment information and/or other information to VS 105. The information may be provided through form fields in the generated order portal (e.g., generated at 104, provided to UE 101 at 106) and/or through some other format. As described above, in some embodiments, a subscriber associated with UE 101 may also provide further information via the portal (e.g., acceptance of contractual terms (e.g., terms of service, cardholder terms, etc.) and/or other information).

Once VS 105 receives the information from UE 101, VS 105 may verify (at 112) the provided payment information and generate a token. The verification may occur, for example, by querying a bank associated with a bank card (e.g., credit card, debit card, etc.) to verify necessary payment details (e.g., billing address, cardholder name, card number, etc.) and/or performing other secure verification functions. If the information is verified, VS 105 may generate a token. The generated token may indicate that the payment information has been verified and/or provide details regarding the provided payment information (e.g., a payment amount).

VS 105 may provide (at 114) the generated token (e.g., from 112) to CCPAC 103. As discussed above, the provided token may indicate that the payment information provided by UE 101 is correct contractual terms. Once CCPAC 103 receives the token, CCPAC 103 may generate and/or provide (at 116) an option for order completion to an agent associated with CCPAC 103. The indication may alert an agent associated with CCPAC 103 that the purchase may be completed (e.g., by a graphical element on a graphical user interface ("GUI") associated with CCPAC 103 and/or another notification, as discussed below with regard to examples shown in FIGS. 3A-4C). The option may allow the agent associated with CCPAC 103 to complete the transaction (e.g., by clicking a button on a GUI, etc.). In some embodiments, the agent associated with CCPAC 103 may determine to not complete the order (e.g., in instances where the purchaser associated with UE 101 has notified the agent to not complete the order, etc.), may change the order (e.g., change devices, services, etc. in the purchase order), make recommendations to the user associated with UE 101, confirm the order (e.g., products and/or services being ordered, shipping address, etc.), and/or provide other assistance over the call.

In instances where the agent associated with CCPAC 103 completes the order, CCPAC 103 may provide (at 118) an order completion notification to VS 105. This notification may include details regarding the amount to charge the verified payment method (e.g., from 112) and/or other information regarding the order request. In some embodiments, the token may be provided as a confirmation to VS 105.

As further depicted, VS 105 may finalize (at 120) the payment which may include processing the received payment information (e.g., from 110) according to the received charge amount (e.g., provided at 118). In some embodiments, VS 105 may charge the subscriber associated with UE 101 as a one-time payment or on a periodic/recurring basis (e.g., according to a payment plan or other periodic charge agreement).

Figure 2:
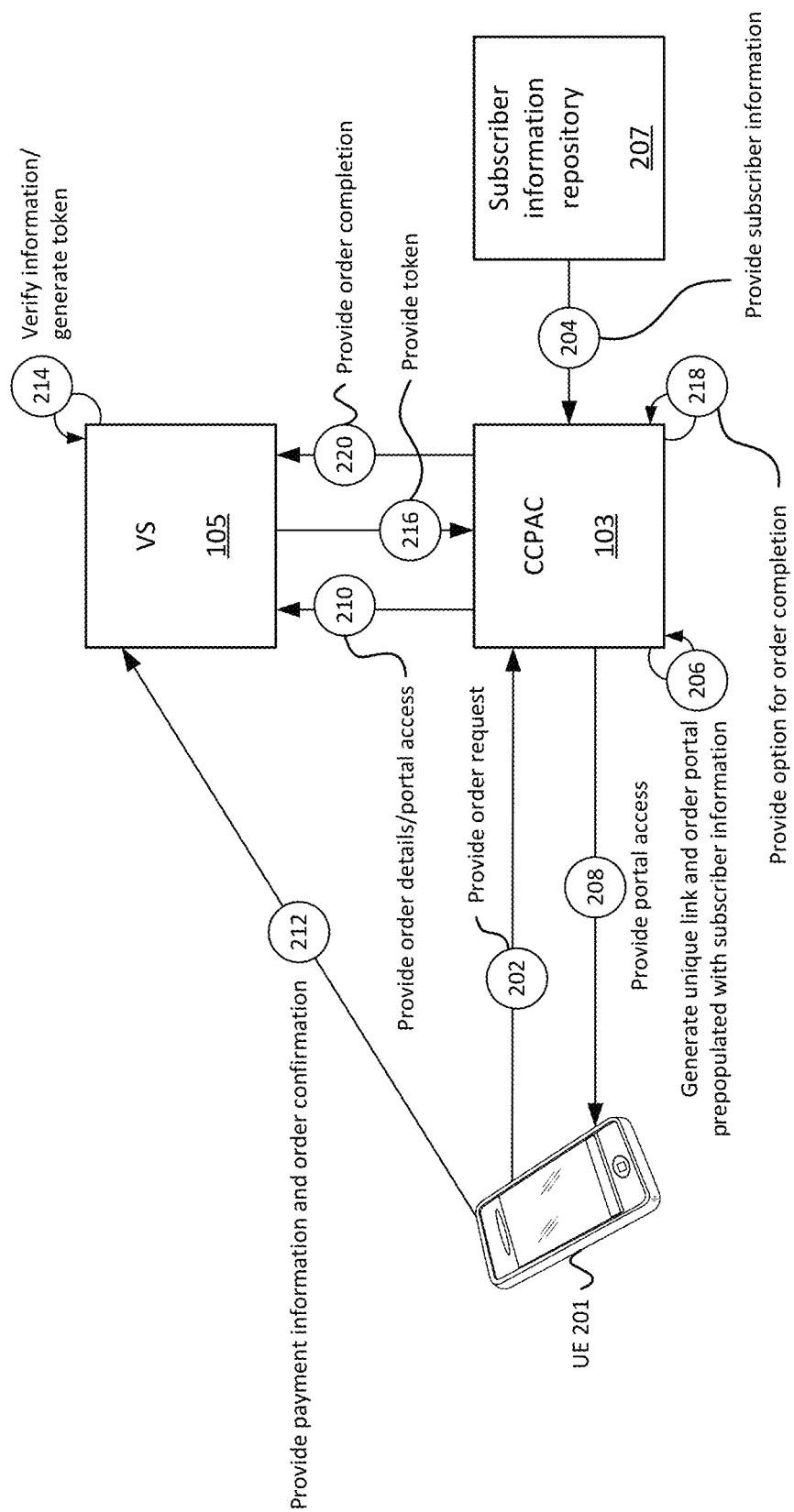
FIG. 2 illustrates an example overview of one or more embodiments described herein, in which a CCPAC uses subscriber information when generating an assisted order.

In some embodiments, CCPAC 103 may receive information regarding UE 101 and/or a subscriber associated with UE 101 from a repository, and use this information when generating the payment portal. For example, as depicted in FIG. 2, CCPAC 103 may receive information from Subscriber Information Repository ("SIR") 207. As discussed herein, SIR 207 may include, may be communicatively coupled with, and/or may be implemented by a user information repository associated with a wireless network, such as a Unified Data Management function ("UDM"), Unified Data Repository ("UDR"), Home Subscriber Server ("HSS"), and/or another type of device or function that stores user or subscriber information for a wireless network.

As depicted in FIG. 2, CCPAC 103 may receive (at 202) an order request from UE 101. The order request may contain information regarding products and/or services (e.g., a phone, phone accessory, service plan changes (e.g., adding or subtracting service lines, changing data plan type, etc.)) to be ordered. In some embodiments, the order request may include, and/or may be based on, communications between UE 101 and the call center (and/or with CCPAC 103), and may be communicated via a voice call, text messaging, selections in a GUI, etc.

Simultaneously and/or after the order request, CCPAC 103 may receive (at 204) information associated with UE 101 (e.g., model, service plan, etc.) and/or the subscriber associated with UE 101 (e.g., billing address, shipping address, other UEs with service plans on the account associated with the subscriber, UEs associated with the subscriber, account number, service plan types, preferred contact method, persons authorized on an account, etc.). The information may be obtained, for example, by providing an identifier (e.g., a MDN, subscriber name, UE identifier (e.g., a Generic Public Subscription Identifier ("GPSI"), Public Land Mobile Network ("PLMN") identifier, Subscription Permanent Identifier ("SUPI"), MDN, International Mobile Subscriber Identity ("IMSI"), International Mobile Station Equipment Identity ("IMEI"), etc.), associated with UE 101, to SIR 207. For example, CCPAC 103 may use an MDN identification service (e.g., caller identification ("Caller ID"), calling line identification ("CLI"), calling number delivery ("CND"), etc.) to determine the MDN associated with UE 101 after receiving a call from UE 101.

As further depicted, CCPAC 103 may generate (at 206) a unique link and order portal. The generated order portal may contain information received from SIR 207 (e.g., from 204) and/or UE 101 (e.g., from 202). For example, as described above, CCPAC 103 may receive information regarding UE 101 and/or the subscriber associated with UE 101, such as the shipping address, billing address, electronic mail address, phone number, and/or other information. The generated portal may also indicate what the order portal is related to (e.g., indicate the services and/or products to be purchased). In some embodiments, the generated order portal may contain form fields requesting additional information from UE 101 (e.g., information not received from SIR 207 and/or UE 101, received information UE 101 may verify (e.g., shipping address, billing address, etc.), etc.). As described above, the unique link may provide an address (e.g., URL) directing UE 101 to the generated order portal. In some embodiments, the generated unique link may expire after a time period and/or may be secured to prevent unauthorized access (e.g., through a login portal, unique code required to access the link, etc.). In some embodiments, the URL (and/or other link) to the portal may include (e.g., as a parameter in the URL) some or all of the information regarding UE 101 and/or the subscriber associated with UE 101. Additionally, or alternatively, the portal itself may be populated (e.g., on an application server and/or other device or system that hosts the portal), such that the URL links to the populated portal.

As further depicted, CCPAC 103 may provide (at 208) the unique link and access information to UE 101. The unique link and/or access information may be provided to UE 101 through an email, SMS, MMS, and/or other method. In some embodiments, CCPAC 103 may provide the information based on preferred communication methods as received from SIR 207 (e.g., from 204). For example, SIR 207 may indicate that the user associated with a purchase order request may prefer to communicate over an application interface. While depicted as a provision to UE 101 (line 208), in some embodiments, the provision may occur to one or more other UEs. For example, assume CCPAC 103 receives a telephone call from UE 101 and receives details from SIR 207 indicating that the subscriber associated with UE 101 prefers filling out forms on a desktop personal computer. In that instance, CCPAC 103 may provide the unique portal link and access information to an email address so that the caller (associated with UE 101) may remain on the phone with the call center agent while the caller (or some other authorized person) fills out the form on a desktop personal computer. As a further example, CCPAC 103 may provide portal access to a person authorized to complete the purchase for an organization (e.g., UE 101 may make an order request but a person in charge of ordering (e.g., information technology department, accounts payable department, etc.), who may complete the transaction).

As further depicted, CCPAC 103 may provide (at 210) order details and portal access to VS 105. As described above, the order details and portal access may include information regarding the verification and/or completion of the order, such as information associated with UE 101 and/or the subscriber associated with UE 101 (e.g., name, shipping address, billing address, etc.), purchase total, purchase details (e.g., devices and/or services to be purchased, etc.), saved payment details, and/or other information. In some embodiments, CCPAC 103 may provide information obtained from SIR 207.

As depicted, UE 101 may provide (at 212) payment information and order confirmation. UE 101 may provide payment information via the provided portal (e.g., from 208). As described above, in some embodiments, some fields in the generated portal may be prepopulated with information (e.g., information received from UE 101 and/or SIR 207). In some embodiments, UE 101 may modify the prepopulated form fields and/or provide additional information. As discussed above, in some embodiments, UE 101 may provide an indication of acceptance of contractual terms (e.g., terms of service, service plan terms, lease terms, etc.).

As further depicted, VS 105 may verify (at 214) the provided information and generate a token. As described above, verification may include communicating with the bank associated with the provided payment information to determine whether the information provided (e.g., from 212) is valid, or determine whether the provided payment information has previously been verified (e.g., stored in a repository associated with VS 105). In instances where the provided payment information is correct, VS 105 may generate a token indicating that the payment information is correct. In some embodiments, the generated token may further indicate that the subscriber associated with UE 101 agreed to contractual terms (e.g., terms of service, lease agreement, etc.).

VS 105 may provide (at 216) the generated token (e.g., from 214) to CCPAC 103. As described above, the token may indicate that the payment information was verified and/or that the user associated with UE 101 agreed to contractual terms. In some embodiments, the information provided in the generated token may be used to update information in the SIR. For example, assume the token provides a billing address. CCPAC 103 may determine whether the billing address provided by the token matches the billing address obtained from the SIR 207. If CCPAC 103 determines the billing address between the token and the information provided by SIR 207 do not match, CCPAC 103 may update SIR 207 with the billing address provided in the token. In some embodiments, a determination to verify information provided by SIR 207 may "flag" (e.g., generate a warning on CCPAC 103) an order for verification. For example, if the shipping address between the token and information provided by SIR 207 do not match, CCPAC 103 may generate a warning indicating that the shipping addresses do not match. The agent associated with CCPAC 103 may query UE 101 regarding the mistake and make corresponding modification (e.g., update the shipping address in the token, etc.). In some embodiments, the mismatch may prevent the agent associated with CCPAC 103 from completing the order (e.g., at 218).

As further depicted, once CCPAC 103 receives the token (e.g., from 216), CCPAC 103 may provide (at 218) an option for order completion. The option for order completion may generate a graphical element on a GUI associated with CCPAC 103 allowing order completion. In some embodiments, CCPAC 103 may generate a notification (e.g., pop-up notification, message, etc.).

As depicted, if the user associated with CCPAC 103 (e.g., agent) completes the order (e.g., activates the option for order completion generated at 218), CCPAC 103 may provide (at 220) an order completion notification to VS 105. As described above, the provided order completion may indicate a final amount to charge the verified payment information or may provide additional information regarding charging (e.g., provide authorization for the charge, provide information regarding periodic or recurring billing, etc.). In some embodiments, the order completion notification may be provided on a recurring basis (e.g., CCPAC 103 (or a user associated with CCPAC 103) may manage when a periodic and/or recurring billing may occur, etc.). The agent may, in some embodiments, not complete the order if the order is flagged. For example, as described above, the order may be "flagged" if the billing address provided by SIR 207 (e.g., from 204) does not match the billing address provided in the provided token (e.g., from 216). As a further example, the agent may not complete the order if the billing address and shipping address do not match.

FIGS. 3A and 3B illustrate an example GUI 300 displayed by CCPAC 103, in which one or more embodiments described herein may be implemented. As shown in FIG. 3A, for example, GUI 300 may include various information, and/or form fields for receiving information, regarding the subscriber (e.g., name, credit card number and security code, billing zip code, purchase amount, and/or other suitable information). In some embodiments, the form fields may be prepopulated after receiving information from SIR 207 (e.g., as described in 204), may be populated by CCPAC 103 (e.g., an agent communicating with the user), and/or may be populated based on information obtained from UE 101 (e.g., from the order request, 102, 202, etc.). For example, the GUI displayed by CCPAC 103 is populated with the cardholder name (as depicted, Joe Subscriber) and the purchase total (i.e., $523.45). As depicted in FIG. 3A, the form does not contain the payment information associated with the subscriber (indicated by the blank line next to the missing payment information lines). Because the payment information has not been verified, and a token received, submit button 301 cannot be activated (e.g., as depicted by the grayed-out graphical element). While depicted as a submit button with a gray background, other colors or manners of display may be used (e.g., bold text, absence of a button, different outline on the button, etc.).

As depicted in FIG. 3B, for example, GUI 300 may be updated once CCPAC 103 receives (e.g., from VS 105) a token verifying payment information (as depicted by the arrow terminating in CCPAC 103 prefaced by "token"). For example, as depicted, the form may be populated with information regarding payment information. In some embodiments (not explicitly depicted here), the form may be populated with information received from SIR 207 and/or UE 101 (e.g., before receiving the token). In some embodiments, as described above, the received token may include information used to populate fields. For security and/or privacy purposes, some of the information provided by and/or with the token may not be disclosed and/or may not be possible to display (e.g., as depicted, an asterisk may be used to indicate the presence of information, but not provide the information). Further, the order completion method (e.g., submit button 303) may be updated to indicate that the order may be completed. For example, as depicted here, GUI 300 may update submit button 301 from a gray background to submit button 303 with a white background. While a white background is used as an example in this case, other colors or manners of display may be used to indicate that the order may be completed (e.g., different text embellishment(s), box outlines, other color background, etc.). In some embodiments, GUI 300 may generate a notification indicating the order may be completed which may be separate from submit button 303 (e.g., a banner notification, pop-up notification, badge notification, etc. displayed separate from submit button 303 in GUI 300 and/or in another location).

GUI 300 is shown for explanatory purposes only. While GUI 300 is depicted in FIGS. 3A and 3B to provide information regarding the purchase, GUI 300 may, in practice, be different than shown. For example, the GUI may not indicate any of the verified payment information (e.g., not provide form lines for card number, card security code, or billing zip code), but rather simply provide a graphical element indicating that the purchase may be completed (e.g., a pop-up notification and/or message, a button, etc.).

Figure 4C:
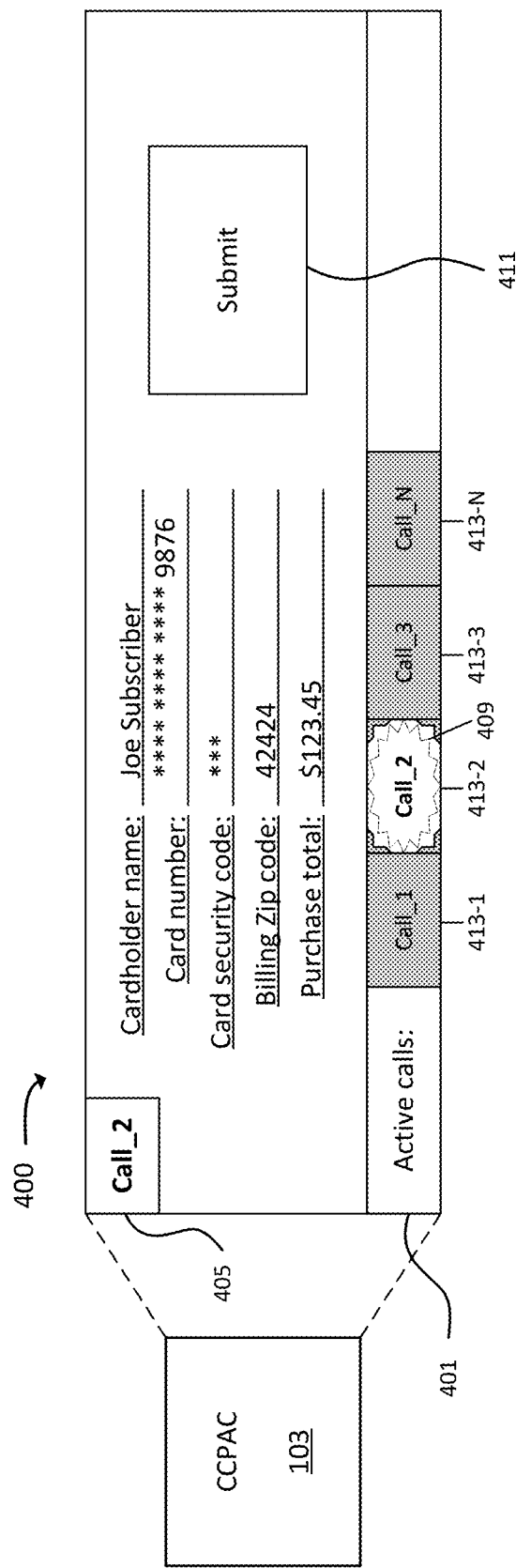

In some embodiments, the user associated with CCPAC 103 (e.g., a call center agent) may manage several orders simultaneously. For example, as depicted in FIGS. 4A-4C example GUI 400 displayed by CCPAC 103 may provide information regarding multiple orders, and embodiments described herein may assist in the fast recognition of orders that are available for immediate attention.

FIG. 4A, for example, depicts example GUI 400 associated with CCPAC 103, which may indicate information for multiple calls (e.g., multiple calls from multiple UEs 101 with CCPAC 103, and/or with a call center associated with CCPAC 103). As shown, GUI 400 may provide an active call list 401 of call identifiers (403-1, 403-2, 403-3, 403-N) associated with active calls (e.g., Call_1 through Call_N). GUI 400 may provide an indication of what call the user is currently on (e.g., as depicted by current call indication 405 and bordered call identifier 403-1 in active call list 401). While current call indication 405 is depicted as being bold and placed in the corner of GUI 400, the information may be communicated in one or more methods (e.g., different textual indication (e.g., font, color, etc.), graphical indication, background color, etc.).

GUI 400 may be tied to the active call. For example, as depicted, CCPAC 103 may be communicating with the UE associated with call_1 while other UEs may be inactive (e.g., CCPAC 103 may be communicating with the UE associated with call_1 while call_2 through call_N are on hold). In some embodiments, when an agent associated with CCPAC 103 switches to another call (e.g., selects call identifier 403-2 to switch to call_2), the UE associated with current call may be placed on hold, and the agent may be connected with the UE associated with the new call. For example, assume, as depicted, CCPAC 103 is currently communicating with a UE associated with call_1. The agent associated with CCPAC 103 may decide to switch to call_2. In that case, the UE associated with call_1 may be placed on hold while the agent is connected with the UE associated with call_2. In some embodiments, similar concepts may apply to communications other than telephonic communications. For example, when switching to call_2, CCPAC 103 may establish/continue a chat dialog with the UE associated with call_2 while disabling/ending a chat dialog with the UE associated with call_1. As depicted, GUI 400 may present some information regarding the call (e.g., the cardholder name is "Jane Purchaser" and a purchase total of $299.95). As further indicated, this call has not received a token verifying the payment information associated with this order (as indicated by the grayed-out submit button 407).

As depicted in FIG. 4B, for example, while on Call_1, CCPAC 103 may receive (e.g., from VS 105) a token for a different call. Here, for example, CCPAC 103 may receive a token for Call_2. CCPAC 103 may receive this token as a result of the verification of payment information from VS 105. The UE associated with call_2 may have previously received access to a portal and may have successfully provided the information to VS 105. In some embodiments, the UE associated with call_2 may have otherwise initiated an order (e.g., began an order through some method other than through a call center such as an online purchase center) and provided the payment information to VS 105. As depicted, once CCPAC 103 receives a token, CCPAC 103 may update GUI 400. For example, as depicted in active call list 401, CCPAC 103 may add a multi-point star border 409 to call identifier 403-2 to indicate that the token was received.

As depicted in FIG. 4C, for example, the user associated with CCPAC 103 may switch to Call_2 (e.g., based on the indication that the token has been received). As shown, GUI 400 may indicate that the call has been switched by the updated graphic information indicating that Call_2 is active (e.g., as shown by current call identifier 405 and call identifier 413-2 in active call list 401). Further, as described above, GUI 400 may indicate that the token has been received by the multi-point star 409 bordering the call identifier in active call list 401, the populated payment information fields (e.g., card number, card security code, billing zip code, etc.), and the activatable (e.g., non-grayed-out) submit button 411.

As described above, GUI 400 is displayed for explanatory purposes only. In some embodiments, GUI 400 may appear differently and/or contain different elements. In some embodiments, the graphical notifications may be displayed differently. For example, instead of using bold text to indicate an active call (e.g., at 405 and 403-1), GUI 400 may use other text modifications such as italic font, different colors, and/or other embellishments. As a further example, an indication that a token was received may be different from a multi-point star. For example, the indication may be a pop-up notification, notification badge, and/or some other graphical embellishment other than a multi-point star.

Figure 5:
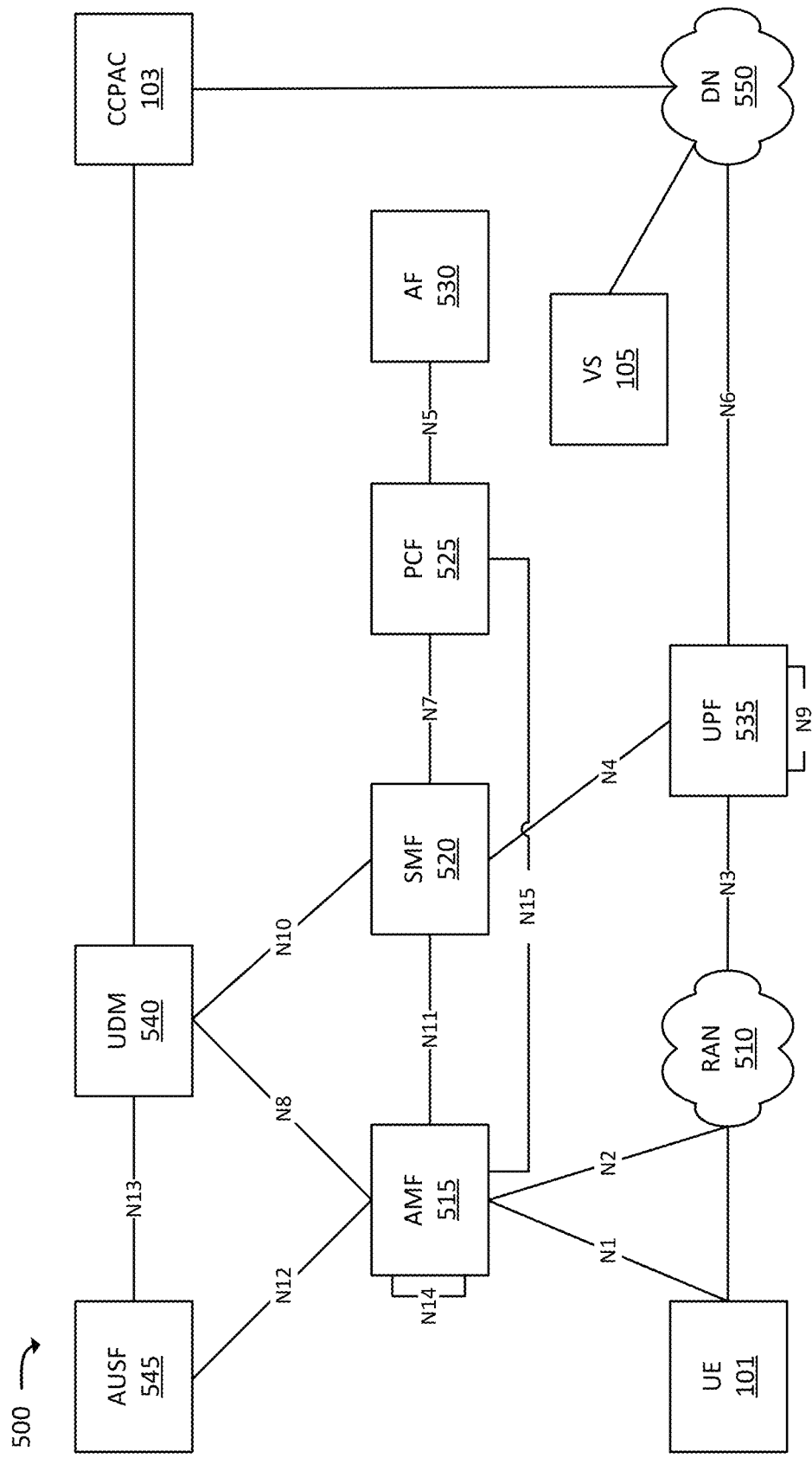
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. As shown, environment 500 may include UE 101, radio access network ("RAN") 510 (which may include one or more Next Generation Node Bs ("gNBs") 512), AMF 515, Session Management Function ("SMF") 520, Policy Control Function ("PCF") 525, Application Function ("AF") 530, User Plane Function ("UPF") 535, UDM 540, Authentication Server Function ("AUSF") 545, Data Network ("DN") 550, VS 105, and CCPAC 103.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 101 may include a computation and communication device, such as a wireless mobile communication device that is capable of communicating with RAN 510 and/or DN 550. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 101 may send traffic to and/or receive traffic (e.g., user plane traffic) from DN 550 via RAN 510 and UPF 535.

RAN 510 may be, or may include, a 5G RAN that includes one or more base stations (e.g., one or more gNBs 512), via which UE 101 may communicate with one or more other elements of environment 500. UE 101 may communicate with RAN 510 via an air interface (e.g., as provided by gNB 512). For instance, RAN 510 may receive traffic (e.g., voice call traffic, data traffic, messaging traffic, signaling traffic, etc.) from UE 101 via the air interface, and may communicate the traffic to UPF 535, and/or one or more other devices or networks. Similarly, RAN 510 may receive traffic intended for UE 101 (e.g., from UPF 535, AMF 515, and/or one or more other devices or networks) and may communicate the traffic to UE 101 via the air interface.

AMF 515 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 515, which communicate with each other via the N14 interface (denoted in FIG. 5 by the line marked "N14" originating and terminating at AMF 515).

SMF 520 may include one or more devices, systems, VNFs, etc., that gather, process, store, and/or provide information in a manner described herein. SMF 520 may, for example, facilitate in the establishment of communication sessions on behalf of UE 101. In some embodiments, the establishment of communications sessions may be performed in accordance with one or more policies provided by PCF 525.

PCF 525 may include one or more devices, systems, VNFs, etc., that aggregate information to and from the 5G network and/or other sources. PCF 525 may receive information regarding policies and/or subscriptions from one or more sources, such as subscriber databases and/or from one or more users (such as, for example, an administrator associated with PCF 525).

AF 530 may include one or more devices, systems, VNFs, etc., that receive, store, and/or provide information that may be used in determining parameters (e.g., quality of service parameters, charging parameters, or the like) for certain applications.

UPF 535 may include one or more devices, systems, VNFs, etc., that receive, store, and/or provide data (e.g., user plane data). For example, UPF 535 may receive user plane data (e.g., voice call traffic, data traffic, etc.), destined for UE 101, from DN 550, and may forward the user plane data toward UE 101 (e.g., via RAN 510, SMF 520, and/or one or more other devices). In some embodiments, multiple UPFs 535 may be deployed (e.g., in different geographical locations), and the delivery of content to UE 101 may be coordinated via the N9 interface (e.g., as denoted in FIG. 5 by the line marked "N9" originating and terminating at UPF 535). Similarly, UPF 535 may receive traffic from UE 101 (e.g., via RAN 510, SMF 520, and/or one or more other devices), and may forward the traffic toward DN 550. In some embodiments, UPF 535 may communicate (e.g., via the N4 interface) with SMF 520, regarding user plane data processed by UPF 535.

AUSF 545 and UDM 540 may include one or more devices, systems, VNFs, etc., that manage, update, and/or store, in one or more memory devices associated with AUSF 545 and/or UDM 540, profile information associated with a subscriber. AUSF 545 and/or UDM 540 may perform authentication, authorization, and/or accounting operations associated with the subscriber and/or a communication session with UE 101. As described above, UDM 540 may be, may be communicatively coupled with, may be implemented by, or may implement features of a SIR (not explicitly shown in this figure).

DN 550 may include one or more wired and/or wireless networks. For example, DN 550 may include an IP-based PDN, a wide area network ("WAN") such as the Internet, a private enterprise network, and/or one or more other networks. UE 101 may communicate, through DN 550, with data servers, other UEs 101, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 605 may communicate.

VS 105 may include one or more devices, systems, VNFs, etc., that verify payment information. For example, as discussed above, VS 105 may communicate with the bank associated with provided payment information. Further, in some embodiments, VS 105 may store and/or maintain information regarding verified payment information.

CCPAC 103 may include one or more devices, systems, VNFs, etc., that processes order requests from a subscriber. As described above, CCPAC 103 may receive information from UDM 540 and/or one or more other devices regarding UE 101 and/or the subscriber associated with UE 101. CCPAC 103 may display, on a UI, various information regarding the purchase. Further, CCPAC 103 may allow a user associated with CCPAC 103 to provide and/or modify information regarding a purchase (e.g., add items to the purchase order, change shipping address, etc.). Further, CCPAC 103 may allow a user associated with CCPAC 103 to complete and/or cancel an order (e.g., through interaction with a graphical element, etc.).

Figure 6:
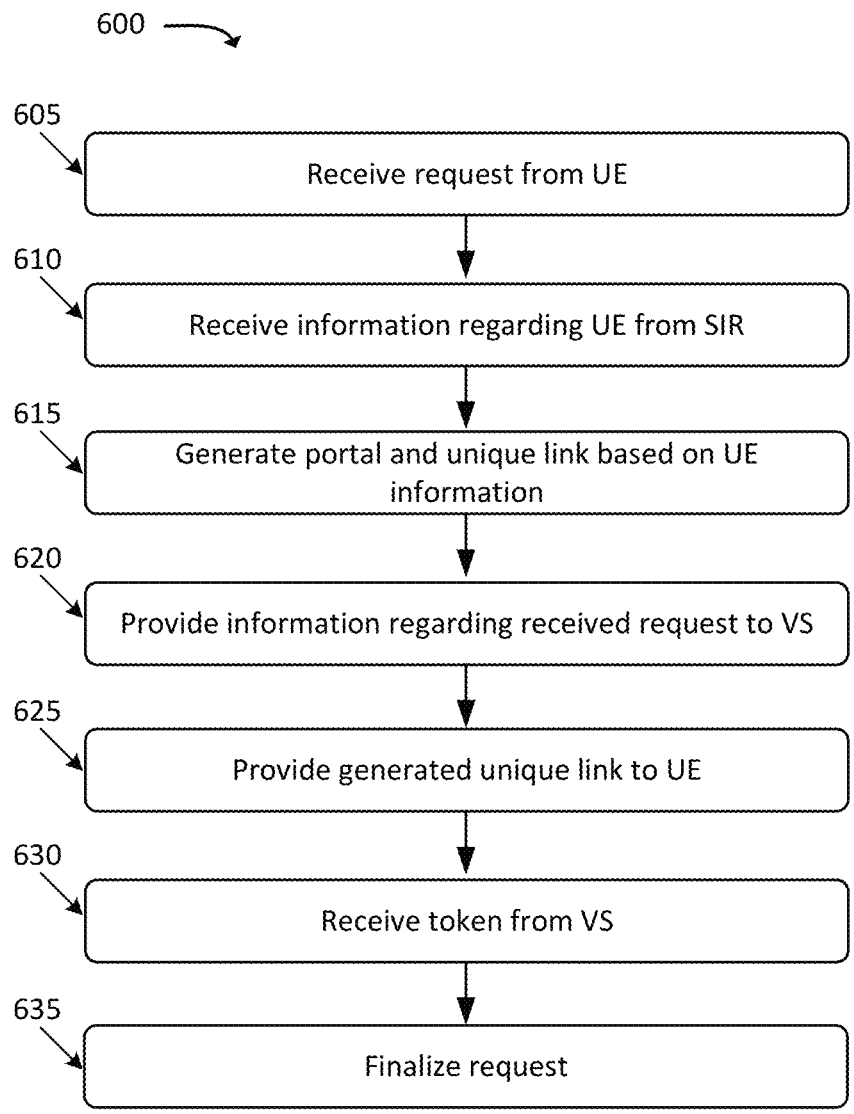
FIG. 6 illustrates an example process for processing an assisted order, in accordance with some embodiments.

FIG. 6 illustrates an example process 600 for processing a request for an assisted order, in accordance with some embodiments. In some embodiments, some or all of process 600 may be performed by CCPAC 103. In some embodiments, one or more other devices may perform some or all of process 600 (e.g., in concert with, and/or in lieu of, CCPAC 103).

As shown, process 600 may include receiving a request from UE 101 (at 605). The request may include, in some embodiments, a description of products, services, etc., to be purchased via an assisted order (e.g., an order placed and/or finalized with the assistance of CCPAC 103, and/or a user associated with CCPAC 103 (e.g., a call center agent)). The request may be initiated by a user associated with UE 101 through a telephone call to a call center. In some embodiments, the request may be initiated through another method (e.g., mailer, online order form, request for additional information, etc.).

Process 600 may further include receiving (at 610) information regarding UE 101 and/or the subscriber associated with UE 101 from SIR 207 (e.g., UDM 540). The received information may include details regarding the subscriber associated with UE 101 such as the subscriber name, contact details, shipping and/or billing address, and/or other information regarding the subscriber. In some embodiments, the information may include contact information for the subscriber (e.g., contact details that are not necessarily tied to UE 101, such as an email address, a chat messaging handle, and/or other contact information). In some embodiments, the information may indicate one or more preferences or rankings of the contact information, such that the user may be attempted to be reached based on preferred or highest ranked contact information. In this manner, the user may be reached in a manner that is different from a manner in which the user contacts the call center associated with CCPAC 103.

Process 600 may additionally include generating (at 615) a portal and unique link based on UE 101 information. As described above, the generated portal may be prepopulated by information received from SIR 207 (e.g., from 610) and/or the received request (e.g., from 605). As described above, the unique link may expire after a period of time. In some embodiments, the unique link may contain parameter information (e.g., the generated portal may use parameter information in the link to populate fields in the portal). In some embodiments, the parameter information may be encrypted using Transport Layer Security ("TLS"), Secure Sockets Layer ("SSL"), and/or one or more other encryption techniques.

Process 600 may also include providing (at 620) information regarding the received request (e.g., from 605) to VS 105. Information provided to VS 105 may include information such as the purchase total, information in the generated portal (e.g., subscriber name, contact information, billing address, etc.), and/or other information. In some embodiments, this information may be provided to VS 105 by UE 101 (e.g., based on the generated unique link, as discussed below), in lieu of being separately provided to VS 105 by CCPAC 103.

Process 600 may further include providing (at 625) the generated unique link to UE 101. As described above, the link may be a URL and/or other address information to direct UE 101 to the generated portal. In some embodiments, the unique link may be provided to UE 101 through messaging such as electronic mail and/or other message formats.

Process 600 may additionally include receiving (at 630) a token from VS 105. The received token may indicate that the payment information was verified. As discussed above, in some embodiments, the token may further provide additional information, such as payment information details, billing address, shipping address, acceptance of contract terms, authorization to complete the purchase, and/or other information.

Process 600 may also include finalizing (at 635) the received request (e.g., from 605). As further described below, finalizing the request may include generating an indication for a user associated with CCPAC 103 to complete the request (e.g., from 605) and generating and/or providing notifications to various systems and/or devices.

Figure 7:
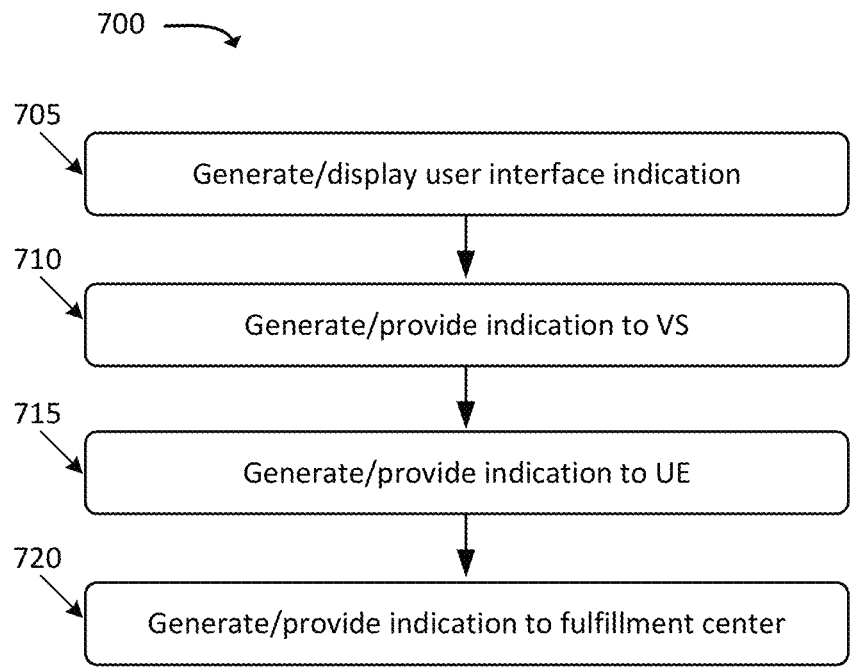
FIG. 7 illustrates an example process for presenting a GUI that facilitates processing of an assisted order, in accordance with some embodiments.

FIG. 7 illustrates an example process 700 for finalizing a request for an assisted order (e.g., an example of finalizing (at 635) a request for an assisted order, as discussed above with respect to FIG. 6). In some embodiments, some or all of process 700 may be performed by CCPAC 103. In some embodiments, one or more other devices may perform some or all of process 700 (e.g., in concert with, and/or in lieu of, CCPAC 103).

As shown, process 700 may include generating and/or displaying (at 705) a GUI indication. As mentioned above, CCPAC 103 may indicate that a user associated with CCPAC 103 may complete the transaction (e.g., as demonstrated in FIGS. 3A-4C). The indication may be a graphical element (e.g., an interactive button, pop-up message, etc.) and/or other notification type.

Process 700 may further include generating and/or providing (at 710) an indication to VS 105. As discussed above, the indication may provide the amount to charge the verified payment information. In some embodiments, the indication may provide an authorization for a recurring or periodic payment. VS 105 may charge the verified payment information based on the provided indication. In some embodiments, the indication may include a previously generated token (e.g., a token generated by VS 105, indicating that the charge would be authorized if submitted).

Process 700 may additionally include generating and/or providing (at 715) an indication to UE 101. This indication may be a receipt, order verification email, and/or any other indication of the payment. In some embodiments, the generated indication may include additional information (e.g., shipping tracking number, shipping estimate, effective date of service changes, etc.).

Process 700 may also include generating and/or providing (at 720) an indication to a fulfillment center. The provided indication may indicate what products and/or services were ordered and may cause the fulfillment center to initiate a process to complete the order (e.g., modify an account or subscription, package and/or ship physical goods, etc.).

Figure 8:
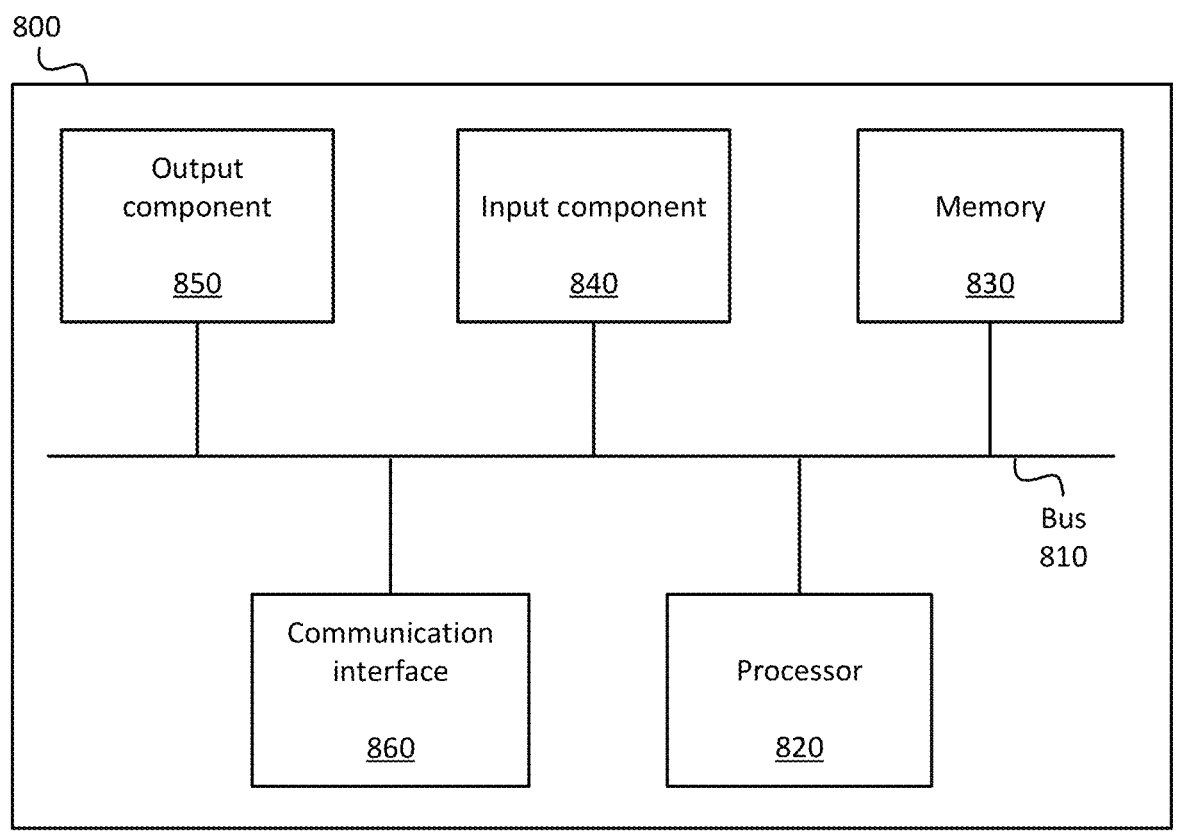
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2, and 5-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a request from a user equipment ("UE"), the request specifying one or more particular items;
generate, based on the request, a portal that includes:
price information for the one or more particular items, and
first locator information for a verification system that receives and verifies payment information corresponding to the price information for the one or more particular items;
generate, based on the request, second locator information for the generated portal;
provide the generated second locator information to the UE;
receive, from the verification system and after the UE has accessed the portal via the second locator information and has provided the payment information via the first locator information, a token, wherein the token indicates verification of the payment information provided to the verification system for the one or more particular items specified in the request;
present, to a particular system and based on the received token, an indication that the one or more particular items, specified in the request, are associated with verified payment information;
receive, from the particular system and after presenting the indication that the one or more particular items are associated with the verified payment information, an indication to finalize the request; and
finalize the request based on receiving the indication to finalize the request.

2. The device of claim 1, wherein the one or more processors are further configured to:
identify additional information regarding the UE, in addition to information included in the request; and
populate a user interface, associated with the portal, with the additional information.

3. The device of claim 2, wherein the one or more processors are further configured to:
identify a device identifier associated with the UE; and
use the device identifier to query a user data repository, associated with a wireless network with which the UE is associated, for the additional information, wherein the additional information is received from the user data repository.

4. The device of claim 3, wherein the user data repository includes at least one of:

a Home Subscriber Server ("HSS"),
a Unified Data Management function ("UDM"), or
a Unified Data Repository ("UDR").

5. The device of claim 2, wherein the UE is a first UE, wherein executing the processor-executable instructions further causes the one or more processors to:
identify, based on the additional information regarding the UE, a second UE associated with the first UE; and
provide, based on the identification, the generated second locator information to the second UE.

6. The device of claim 5, wherein the generated second locator information is provided to the second UE in lieu of the first UE.

7. The device of claim 1, wherein, presenting the indication that the one or more particular items are associated with verified payment information causes the particular system to:
present a user interface, wherein the user interface includes:
an indication of the verification of the payment information provided to the verification system for one or more particular items, and
an indication that the one or more particular items, specified in the request, are associated with verified payment information.

8. A non-transitory computer-readable medium, storing a plurality of processor-executable instructions, which, when executed by one or more processors, causes the one or more processors to:
receive a request from a user equipment ("UE"), the request specifying one or more particular items;
generate, based on the request, a portal that includes:
price information for the one or more particular items, and
first locator information for a verification system that receives and verifies payment information corresponding to the price information for the one or more particular items;
generate, based on the request, second locator information for the generated portal;
provide the generated second locator information to the UE;
receive, from the verification system and after the UE has accessed the portal via the second locator information and has provided the payment information via the first locator information, a token, wherein the token indicates verification of the payment information provided to the verification system for the one or more particular items specified in the request;
present, to a particular system and based on the received token, an indication that the one or more particular items, specified in the request, are associated with verified payment information;
receive, from the particular system and after presenting the indication that the one or more particular items are associated with the verified payment information, an indication to finalize the request; and
finalize the request based on receiving the indication to finalize the request.

9. The non-transitory computer-readable medium of claim 8, wherein the processor-executable instructions further include processor-executable instructions to:
identify additional information regarding the UE, in addition to information included in the request; and
populate a user interface, associated with the portal, with the additional information.

10. The non-transitory computer-readable medium of claim 9, wherein the processor-executable instructions further include processor-executable instructions to:
identify a device identifier associated with the UE; and
use the device identifier to query a user data repository, associated with a wireless network with which the UE is associated, for the additional information, wherein the additional information is received from the user data repository.

11. The non-transitory computer-readable medium of claim 10, wherein the data repository includes at least one of:
a Home Subscriber Server ("HSS"),
a Unified Data Management function ("UDM"), or
a Unified Data Repository ("UDR").

12. The non-transitory computer-readable medium of claim 9, wherein the processor-executable instructions further include processor-executable instructions to:
identify, based on the additional information regarding the UE, a second UE associated with the first UE; and
provide, based on the identification, the generated second locator information to the second UE.

13. The non-transitory computer-readable medium of claim 12, wherein the generated second information is provided to the second UE in lieu of the first UE.

14. The non-transitory computer-readable medium of claim 8, wherein presenting the indication that the one or more particular items are associated with verified payment information causes the particular system to:
present a user interface, wherein the user interface includes:
an indication of the verification of the payment information provided to the verification system for one or more particular items, and
an indication that the one or more particular items, specified in the request, are associated with verified payment information.

15. A method, comprising:
receiving a request from a user equipment ("UE"), the request specifying one or more particular items;
generating, based on the request, a portal that includes:
price information for the one or more particular items, and
first locator information for a verification system that receives and verifies payment information corresponding to the price information for the one or more particular items;
generating, based on the request, second locator information for the generated portal;
providing the generated second locator information to the UE;
receiving, from the verification system and after the UE has accessed the portal via the second locator information and has provided the payment information via the first locator information, a token, wherein the token indicates verification of the payment information provided to the verification system for the one or more particular items specified in the request;
presenting, to a particular system and based on the received token, an indication that the one or more particular items, specified in the request, are associated with verified payment information;
receiving, from the particular system and after presenting the indication that the one or more particular items are associated with the verified payment information, an indication to finalize the request; and
finalizing the request based on receiving the indication to finalize the request.

16. The method of claim 15, further comprising:
identifying, additional information regarding the UE, in addition to information included in the request; and
populating, a user interface, associated with the portal, with the additional information.

17. The method of claim 16, further comprising:
identifying, a device identifier associated with the UE; and
using, the device identifier to query a user data repository, associated with a wireless network with which the UE is associated, for the additional information, wherein the additional information is received from the user data repository.

18. The method of claim 17, wherein the user data repository includes at least one of:
a Home Subscriber Server ("HSS"),
a Unified Data Management function ("UDM"), or
a Unified Data Repository ("UDR").

19. The method of claim 16, further including:
identifying, based on the additional information regarding the UE, a second UE associated with the first UE; and
providing, based on the identification, the generated second locator information to the second UE in lieu of providing the generated second locator information to the first UE.

20. The method of claim 15, wherein presenting the indication that the one or more particular items are associated with verified payment information further causes the particular system to:
present, a user interface, wherein the user interface includes:
an indication of the verification of the payment information provided to the verification system for one or more particular items, and
an indication that the one or more particular items, specified in the request, are associated with verified payment information.

* * * * *